G. A. DE KAY.
COTTON PLANTER.
APPLICATION FILED AUG. 13, 1913.

1,107,044.

Patented Aug. 11, 1914.
2 SHEETS—SHEET 1.

Witnesses
Stuart Hilder.
Frances M. Anderson.

Inventor
George A. De Kay
By
E. W. Anderson
Attorneys

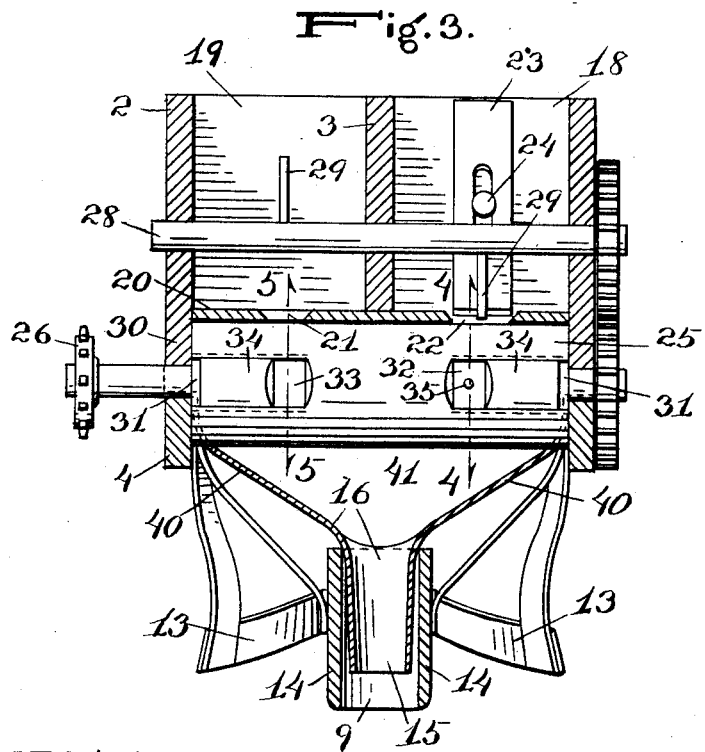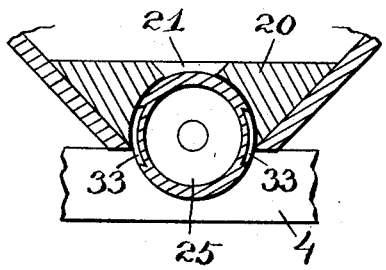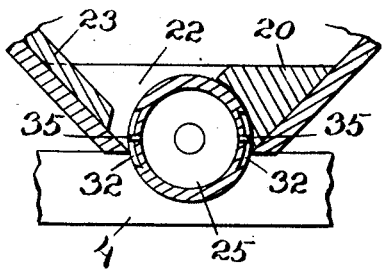

UNITED STATES PATENT OFFICE.

GEORGE A. DE KAY, OF CAMDEN, SOUTH CAROLINA.

COTTON-PLANTER.

1,107,044. Specification of Letters Patent. Patented Aug. 11, 1914.

Application filed August 13, 1913. Serial No. 784,542.

*To all whom it may concern:*

Be it known that I, GEORGE A. DE KAY, a citizen of the United States, resident of Camden, in the county of Kershaw and State of South Carolina, have made a certain new and useful Invention in Cotton-Planters; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
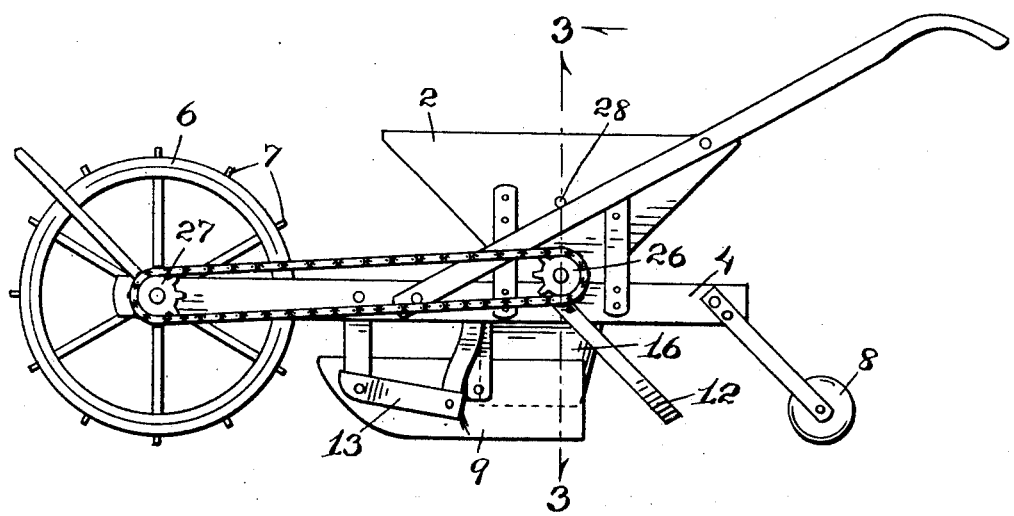
Figure 2:
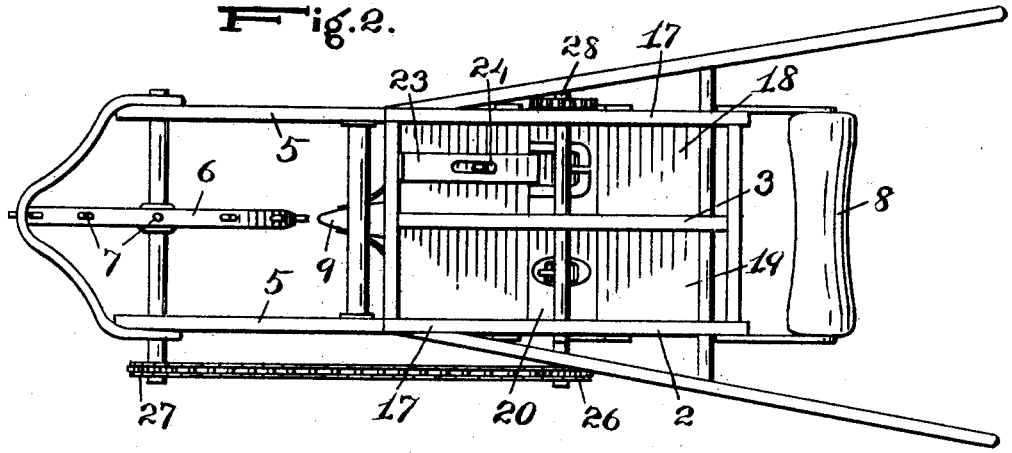

Figure 1 is a side view of the invention as applied. Fig. 2 is a plan view of the same. Fig. 3 is a section on the line 3—3, Fig. 1. Fig. 4 is a detail section on the line 4—4, Fig. 3. Fig. 5 is a detail section on the line 5—5, Fig. 3.

The object of the invention is to provide in a cotton planter, improved devices for planting the seed with fertilizer and relating to the regulation of the seed dropping, the hills being any ordinary distance apart.

The invention consists in the novel construction and combinations of parts as hereinafter set forth.

In the accompanying drawings illustrating the invention, the numeral 2, designates a hopper or receiver, separated into lateral chambers by a partition 3, and carried upon a frame 4, having parallel side bars 5, 5. This frame is supported in front by a drive wheel 6, having a series of radial spurs 7 on its perimeter; supported in rear by the drag roller 8, and supported between the wheel and roll by the furrow opening shoe 9. Drag covers are indicated at 12. The shoe is provided with lateral horizontal clearing wings 13.

The furrow opening shoe 9 is of elongated runner form, tapering in front and having in rear parallel exterior side walls 14, between which is received the lower end 15, of the deposition chute 16, the rear wall of which is about even with the rear vertical ends of the side walls of the shoe. The lower end of the chute is several inches above the lower edges of these side walls.

The chute is elongated from front to rear and narrow from side to side, its sides having upward and vertical inclined extensions 40 for connection with the frame. Between these extensions the chute is open in rear for inspection as at 41.

The hopper 2 is designed to have parallel vertical side walls 17, and a vertical partition wall 3, separating it into a seed chamber 18, and a fertilizer chamber 19. Its front and rear walls are inclined downward and toward each other to the bottom or floor 20, which is above the transfer or feed roller. The bottom or floor is provided with an opening 21, in the chamber 19, and in the seed chamber with a discharge opening 22, which extends forward to the front wall of this chamber, and is broad enough to receive the lower end of a seed gate 23, which is seated on said front wall in radial position with reference to the transfer roller, and is adjustable endwise, the adjustment being secured by means of a suitable clamp screw 24.

The bottom of the hopper floor is cylindrically concave and is adapted to approximate closely the surface of the transfer roller 25, which extends transversely under said floor, and is provided with journals engaging bearings of the frame. On one of these journals is a removable sprocket wheel 26, which is connected to a sprocket wheel 27 on the shaft of the drive wheel. Sprocket wheels differing in size are designed to be provided in order to vary the rotary movement of the transfer roller and thereby provision is made for planting the hills at different distances apart as may be desired. The other journal of the transfer roller 25, is provided with gearing in connection with a shaft 28, extending transversely through the hopper above the floor, and provided with stirring arms 29, extending radially and designed to operate in close relation to the discharge openings of the chambers of said hopper.

The transfer roller is made with shoulder ends adjacent to the inside surfaces of extensions 30 of the hopper walls below the floor 20, and its cylindrical surface extending from such chamber ends is provided with guideways 31, extending toward the middle of the roller, and terminating in recesses 32 and 33, in the roller. These recesses extend circumferentially and are of sufficient length on the curve respectively to receive the amount of seed required for one hill and the amount of fertilizer to be carried down therewith. Each guideway 31, is provided with a cut off slide or slide wall 34 designed to be adjusted to limit the amount of seed or fertilizer entering the depositing recess. The seed recess 32, is provided with one or more short pins or projections 35, at points intermediate its ends, these being designed to prevent the seed from bunching. The seed will in this way follow one another, so that they will be planted in succession in the hills.

The transfer roller is usually made with two or more transfer recesses at each end, and at equal distances apart, and the stirring arms 29 of the shaft 28, are provided in number and position to correspond. The ends of the stirring arms are designed to extend to or into the openings 22 in the floor of the hopper, and their operation is rendered more effective in this way, especially in the seed hopper, wherein the arms rotate in the plane of the seed recess of the transfer roller, and, passing near the pins therein, coöperate therewith in breaking up the bunches of seed.

I claim:—

1. A cotton planter having lateral hopper chambers, a hopper floor having a concave bottom, and discharge openings for said chambers, a transfer roller having open-end longitudinal recesses adjacent to said concave bottom, adjustable limiting slide walls for such recesses, an adjustable seed gate, a stirrer shaft in said hopper above and geared to the transfer roller stirring arms of said shaft extending into said discharge openings, and means for operating the transfer roller.

2. In a cotton planter, a hopper having lateral chambers, a hopper floor having a concave bottom and discharge openings, a transfer roller having open-end longitudinal recesses circumferentially curved, and adjacent to said concave bottom, seed-operating pins in said recesses, and longitudinally adjustable slide walls engaging said recesses, a stirrer shaft above said roller in the hopper, arms of said shaft adapted to pass near said pins in said recesses, and gearing for operating said shaft and said roller.

In testimony whereof I affix my signature, in presence of two witnesses.

G. A. DE KAY.

Witnesses:
J. G. CUNNINGHAM,
J. B. CURETON.

---

Copies of this patent may be obtained for five cents each, by addressing the "Commissioner of Patents, Washington, D. C."